3,099,531
NITRIC ACID MANUFACTURE
Donald E. Boynton, Salt Lake City, Utah, assignor to Hercules Powder Company, Wilmington, Del., a corporation of Delaware
Filed Sept. 28, 1960, Ser. No. 58,945
6 Claims. (Cl. 23—157)

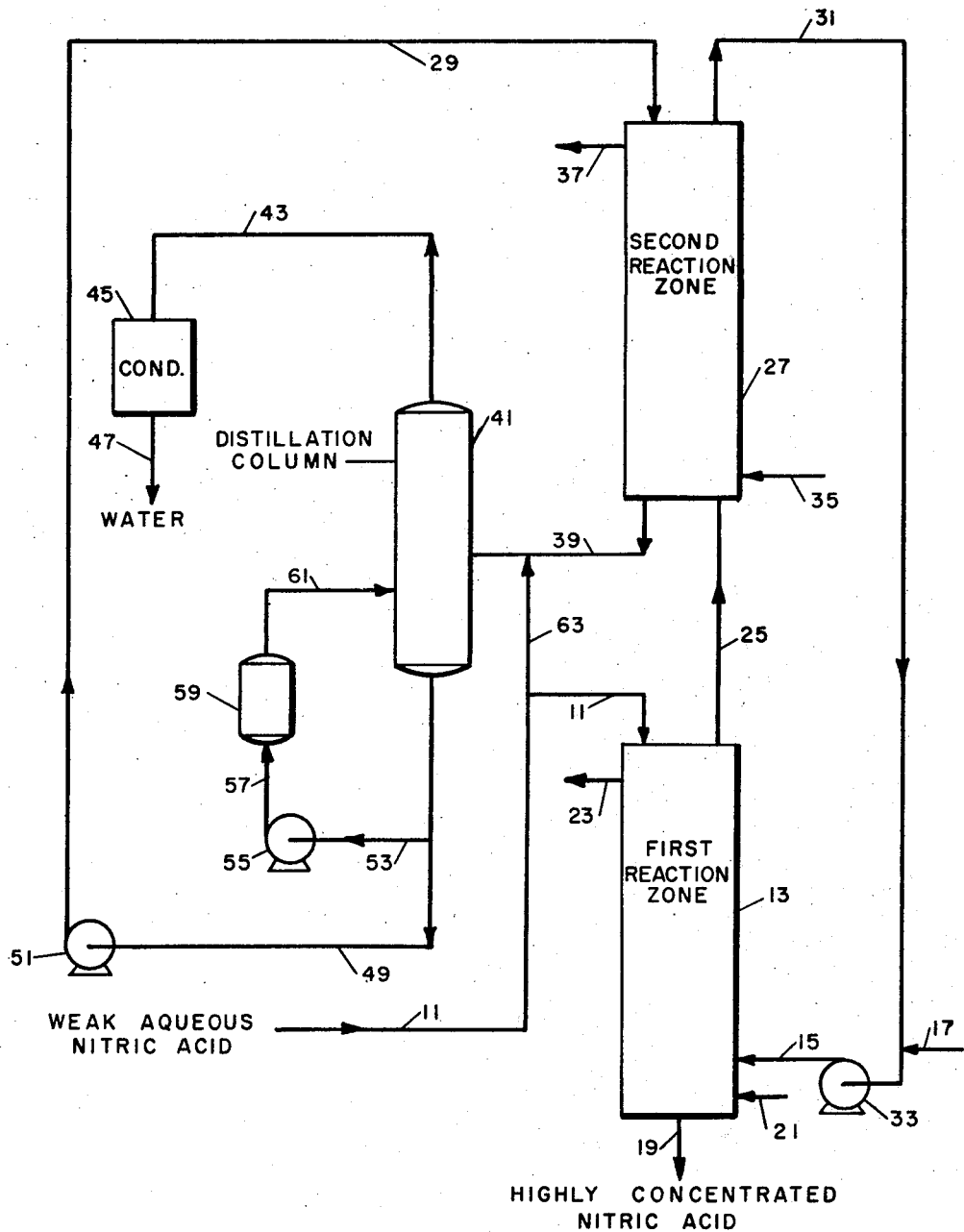

This invention relates to the manufacture of highly concentrated nitric acid. More particularly, this invention relates to a new process for the manufacture of highly concentrated nitric acid.

By highly concentrated nitric acid is meant nitric acid containing more than 68% by weight of nitric acid, and there is a substantial commercial demand for such highly concentrated nitric acid, particularly nitric acid having a concentration of at least about 90% by weight of $HNO_3$. However, most of the nitric acid produced commercially, from ammonia oxidation for example, is in the form of weak aqueous solutions having a concentration of less than 68% by weight of $HNO_3$. It is a well-known fact that nitric acid and water form an azeotrope containing about 68% nitric acid and about 32% water. Consequently, highly concentrated nitric acid cannot be obtained by simple fractional distillation of such weak aqueous nitric acids containing less than 68% by weight of $HNO_3$. The usual practice, therefore, when it is desired to produce highly concentrated nitric acid, is to resort to extractive distillation of weak aqueous nitric acid in the presence of a dehydrating agent such as concentrated sulfuric acid or a concentrated solution of magnesium nitrate, and there are processes based on each of these dehydrating agents. For various reasons, however, it is desirable to produce highly concentrated nitric acid from weak aqueous nitric acid without having to resort to extractive distillation in the presence of a dehydrating agent.

It is an object of this invention to provide a new process for the manufacture of highly concentrated nitric acid from weak aqueous solutions thereof.

It is a further object of this invention to provide a new process for the manufacture of highly concentrated nitric acid from weak aqueous solutions thereof without resorting to extractive distillation in the presence of a dehydrating agent.

The foregoing objects, as well as others which will become apparent from the following description, are accomplished in accordance with this invention which, generally described, comprises passing nitrogen dioxide into the lower portion of a first reaction zone in countercurrent flow to aqueous nitric acid containing not more than 68% by weight of nitric acid at a temperature below about 40° C., recovering highly concentrated nitric acid containing more than 68% by weight of nitric acid from the bottom of said first reaction zone, taking off nitric oxide gas as an overhead product from said first reaction zone and passing said nitric oxide gas into the lower portion of a second reaction zone in countercurrent flow to nitric acid of from about 55% to about 68% by weight of $HNO_3$ at a temperature between about 75° C. and about 125° C., recovering nitrogen dioxide as an overhead product from the upper portion of said second reaction zone, and recycling the recovered nitrogen dioxide from said second reaction zone into the lower portion of said first reaction zone.

In the first reaction zone nitrogen dioxide reacts with water which is present in the weak aqueous nitric acid fed to said first reaction zone to form nitric acid and nitric oxide according to the following reaction:

$$3NO_2 + H_2O \rightarrow 2HNO_3 + NO\uparrow \qquad (1)$$

In this way the concentration of the nitric acid recovered from the bottom of the first reaction zone can be raised above 68% and it is entirely feasible to produce 99+% nitric acid directly from the first reaction zone.

In the second reaction zone, the nitric oxide taken off as an overhead product from the first reaction zone reacts with nitric acid which is fed to the second reaction zone according to the following reaction:

$$2HNO_3 + NO \rightarrow 3NO_2\uparrow + H_2O \qquad (2)$$

Thus, in the second reaction zone, nitrogen dioxide is regenerated, and is then recycled to the first reaction zone. This invention, therefore, is seen to be a cylical process involving nitric oxide and nitrogen dioxide as intermediates, characterized by the fact that the intermediates, namely, nitric oxide and nitrogen dioxide, circulate in a closed loop around through the two reaction zones, the nitric oxide generated in the first reaction zone being cycled to the second reaction zone and consumed therein to generate nitrogen dioxide which is cycled to the first reaction zone and in turn is consumed therein to generate nitric oxide. In this process weak aqueous nitric acid is fed to each of the two reaction zones, and by virtue of the closed loop circulation of the nitrogen oxide intermediates, the first reaction zone produces a nitric acid of higher concentration than the feed acid thereto, whereas the second reaction zone produces a nitric acid of lower concentration than the feed acid thereto, the net effect of the process being a separation of water from weak aqueous nitric acid in the first reaction zone to produce highly concentrated nitric acid.

For example, the operation of the present invention may be carried out in the following manner, as illustrated by the accompanying drawing, in which the figure represents diagrammatically a flow sheet of an embodiment of the invention. As shown by the drawing, weak aqueous nitric acid containing not more than 68% by weight of $HNO_3$ is introduced via line 11 into the upper portion of a first reaction zone 13 which conveniently may be an enclosed plate or packed column jacketed for heat exchange. A suitable source for the weak aqueous nitric acid employed in this invention can be the product stream from an ammonia oxidation plant. Nitrogen dioxide via line 15 is introduced into the lower portion of first reaction zone 13 and passes upwardly therein in countercurrent flow to nitric acid flowing downwardly therein. Nitrogen dioxide to initiate the process, as well as any fresh make-up nitrogen dioxide required to keep the process in balance during continuous operation by replacing nitrogen dioxide lost in the process because of process inefficiencies, solubility in acid withdrawn from the process, and the like, is introduced into the system via line 17.

Nitrogen dioxide reacts with water present in the weak aqueous nitric acid in first reaction zone 13 to produce nitric acid, thereby increasing the strength of the nitric acid as it flows down through the first reaction zone to produce highly concentrated nitric acid containing more than 68% by weight of $HNO_3$ which is drawn off and recovered via line 19. Coolant for maintaining suitable temperatures in first reaction zone 13 is provided via jacket inlet 21 and jacket outlet 23.

The reaction in first reaction zone 13 also generates nitric oxide gas which is taken off as an overhead product and is passed via line 25 into the lower portion of second reaction zone 27 which may also conveniently be an enclosed plate or packed column jacketed for heat exchange. Weak aqueous nitric acid of about 55% to about 68% by weight of $HNO_3$ is introduced via line 29 into the upper portion of second reaction zone 27, and flows downwardly therein in countercurrent flow to nitric oxide flowing upwardly therein. The nitric oxide reacts with nitric acid in second reaction zone 27 to generate nitrogen dioxide which is recovered as an overhead product and is recycled via line 31, pump 33, and line 15 back into the lower portion of first reaction zone 13. Heating medium for maintaining suitable temperatures in second reaction zone 27 is provided via jacket inlet 35 and jacket outlet 37.

Although the preceding description refers to first reaction zone 13 and second reaction zone 27 as conveniently being jacketed for heat control, it should be understood that the invention is by no means limited in this respect, for other equivalent heat exchange means, such for example as internal coils, external heat exchangers, and the like, in any combination may be employed, with or without reaction zone jacketing, to maintain suitable temperatures within first reaction zone 13 and second reaction zone 27.

The reaction in second reaction zone 27 also generates water, thereby diluting the nitric acid as it flows down through the second reaction zone, and this diluted acid is withdrawn from the bottom of the second reaction zone and is conveyed via line 39 to distillation column 41 for reconcentration by fractional distillation. Distillation column 41 is a conventional plate or packed column. Water is taken off overhead via line 43, is condensed in condenser 45, and discarded via line 47. Reconcentrated aqueous nitric acid containing between about 55% and about 68% by weight of nitric acid is removed from the bottom of distillation column 41 and is recycled via line 49, pump 51, and line 29 to the upper portion of second reaction zone 27. Heat for the distillation in column 41 is provided by recycling part of the reconcentrated aqueous nitric acid via line 53, pump 55, line 57, reboiler 59 and line 61 back into distillation column 41. Since the reaction in second reaction zone 27 consumes nitric acid, make-up acid can be supplied for the reaction therein via line 63.

In practicing this invention there is considerable latitude in the choice of temperatures and pressures, concentration and circulation of intermediate streams, arrangement of equipment, batch-wise or continuous operation, and the like. It will be understood, therefore, that the invention is by no means limited to the embodiment illustrated in the drawing, for many variations are possible within the scope of the invention depending upon specific needs and circumstances.

For example, the equipment can be so arranged that all weak aqueous nitric acid fed to the system is first subjected to fractional distillation, and the fractionally distilled acid then used as feed acid for either or both of the reaction zones. On the other hand, such fractionally distilled aqueous nitric acid can be supplied as feed acid for the second reaction zone, and the diluted acid produced therein can be utilized as feed acid for the first reaction zone. Alternatively, the diluted acid produced in the second reaction zone can be withdrawn completely from the system and utilized for ammonium nitrate manufacture, or returned to an ammonia oxidation plant for utilization there, or otherwise employed depending upon specific needs and circumstances. One skilled in the art will readily visualize other alternative arrangements within the scope of this invention.

As pointed out hereinbefore, in the first reaction zone nitrogen dioxide reacts with water which is present in the weak aqueous nitric acid fed thereto to form nitric acid and nitric oxide in accordance with Reaction 1 set forth above. Suitable temperatures for this reaction have been found to be between about 0° C. and about 40° C., with temperatures between about 20° C. and about 40° C. being preferred. Temperatures appreciably above 40° C. are undesirable because as temperature is progessively raised above about 40° C., there is a progressively increased tendency for the reverse reaction to take place, i.e., for nitric acid to react with nitric oxide to produce water and nitrogen dioxide, thus tending to defeat the purposes of this invention. Within the practical operative range of temperatures as set forth above this reverse reaction is relatively insignificant. Although temperatures below about 0° C., down to the freezing point of the weak aqueous nitric acid employed, are feasible, such low temperatures are not presently considered to be practical since they involve employment of expensive refrigeration facilities.

A relatively wide range of pressures, between about atmospheric pressure and about 10 atmospheres, can be utilized in carrying out the reaction in the first reaction zone.

With respect to the concentration of acid fed to the first reaction zone, it can be pointed out that any convenient concentration of nitric acid, including pure water, is operative for the reaction therein. However, generally there is no practical advantage to be gained by employing either water, per se, or weak aqueous nitric acid containing less than about 50% by weight of $HNO_3$, since nitric acid of at least about 50% by weight of $HNO_3$ is readily available as the product stream from an ammonia oxidation plant. Moreover, since the objective of this invention is to produce highly concentrated nitric acid from weak aqueous solutions thereof, there is also no practical advantage to be gained by employing nitric acid containing more than 68% by weight of $HNO_3$, since such acid is already a highly concentrated nitric acid. Accordingly, therefore, it is presently preferred to employ weak aqueous nitric acid in the range of concentration between about 50% and about 68% by weight of $HNO_3$. As previously pointed out, the nitric acid product stream from an ammonia oxidation plant, and containing generally between about 50% and about 63% by weight of $HNO_3$ depending on operating conditions of the plant, is a convenient source of weak aqueous nitric acid for employment in the first reaction zone. If desired, however, the weak aqueous nitric acid produced by an ammonia oxidation plant can be subjected to fractional distillation to produce higher concentrations of nitric acid up to about 68% by weight of $HNO_3$, and such fractionally distilled acid can be employed as the feed acid to the first reaction zone. From the foregoing description, therefore, it is evident that there is a wide latitude of choice as to the particular concentration of acid to be employed as the feed acid to the first reaction zone, with the particular concentration chosen depending largely on the specific circumstances and needs in each case.

Reference to Reaction 1 set forth above shows that complete conversion of water to nitric acid in the first reaction zone requires three mols of nitrogen dioxide for every mol of water present in the weak aqueous nitric acid fed to the first reaction zone, and as previously pointed out, it is entirely feasible to produce 99+% nitric acid directly from the first reaction zone. However, the operation of the invention is considered to be more flexible when the reaction in the first reaction zone produces highly concentrated nitric acid in the range of concentrations from about 75% to about 90% by weight of $HNO_3$, which is then rectified by fractional distillation into 99+% nitric acid and the azeotrope containing 68% by weight of $HNO_3$, and recycling the azeotrope back into the system as feed acid to either the first or second reaction zone, as desired. It is evident, therefore, that the amount of nitrogen dioxide to be employed will depend both upon the concentration of the weak aqueous nitric acid fed to the first reaction zone, and upon the desired concentration of the highly concentrated nitric acid produced in the first reaction zone. However, in any case the amount of nitrogen dioxide employed will be at least sufficient to form with the weak aqueous nitric acid in the first reaction zone a highly concentrated nitric acid containing more than 68% by weight of $HNO_3$, and this represents the minimum amount of nitrogen dioxide for practice of the invention. Actually, the process of this invention is operative with as little as 0.05 part by weight of nitrogen dioxide per part by weight of weak aqueous nitric acid when employing the 68% azeotrope as feed nitric acid to the first reaction zone. Similarly, a 60% by weight $HNO_3$ feed acid requires a theoretical minimum of about 0.3 part by weight of nitrogen dioxide per part by weight of 60% HNO₃ feed acid, and a 50% by weight HNO₃ feed acid requires a theoretical minimum of about 0.54 part by weight of nitrogen dioxide per part by weight of 50% HNO₃ feed acid. The above minimum amounts of nitrogen dioxide correspond to production of nitric acid of approximately 70% by weight HNO₃. On the other hand, the respective theoretical amounts of nitrogen dioxide required to convert all of the water present in 68% HNO₃, 60% HNO₃ and 50% HNO₃ feed acids to HNO₃ are, respectively, about 2.45, about 3.07 and about 3.83 parts per part by weight of 68% HNO₃, 60% HNO₃ and 50% HNO₃ feed acids. In like manner, the theoretical amount of nitrogen dioxide required to produce highly concentrated nitric acid of any desired concentration from weak aqueous nitric acid of any concentration can be readily ascertained. Generally, however, an amount of nitrogen dioxide in excess of theoretical requirements will be employed. According to this invention, therefore, the amount of nitrogen dioxide employed will be between about 0.05 part and about 10 parts by weight per part of weak aqueous nitric acid fed to the first reaction zone, and at least sufficient to react with enough water present in the reaction mixture in the first reaction zone so that all of the nitric acid recovered from the bottom of the first reaction zone has a concentration above 68% by weight of HNO₃.

The term "nitrogen dioxide" as employed herein connotes NO₂, N₂O₄ or such equilibrium mixture of NO₂ and N₂O₄ as may exist under the conditions prevailing in each step of the process.

Various methods are known for the manufacture of the nitrogen dioxide or nitrogen tetroxide employed as an intermediate nitrogen oxide reactant in the practice of this invention. These methods include the thermal cracking of highly concentrated nitric acid, the absorption of nitrogen dioxide from ammonia oxidation units in various desiccants, and the reaction of nitric acid with sulfur. Another method for preparing nitrogen tetroxide suitable for use in the present invention is described in copending application Serial No. 819,496 to Donald G. Morrow, now Patent No. 3,063,804, wherein it is disclosed that the hot gas mixture from an ammonia oxidation unit containing a mixture of nitric oxide, oxygen, nitrogen and water, is rapidly cooled to a temperature above its dew point in the range between 300° C. and 500° C., and is then passed into the lower portion of a reactor in countercurrent flow to relatively cool nitric acid at about 25° C., for example, to produce higher oxides of nitrogen. The overhead product from the reactor, comprising primarily nitrogen dioxide, nitrogen, oxygen, water and nitric acid is condensed in a water cooled condenser to remove substantially all the water and nitric acid as condensate, and the remaining uncondensed product is then subjected to further condensation in a cold brine-cooled condenser at a temperature of about −9° C. to obtain a condensate of nitrogen tetroxide containing approximately 98.9% N₂O₄, 0.7% H₂O and 0.4% HNO₃, which condensate is quite suitable for the purposes of the present invention.

The highly concentrated nitric acid recovered from the bottom of the first reaction zone will ordinarily contain some dissolved nitrogen oxides. If desired, these dissolved nitrogen oxides can be removed by heating the highly concentrated nitric acid product, or by sparging with air or inert gas, or by a combination of heating and sparging. Such treatment will give the highly concentrated white nitric acid usually desired.

The nitric oxide generated as a by-product in the first reaction zone is passed into the lower portion of the second reaction zone where it reacts with nitric acid to form nitrogen dioxide and water in accordance with Reaction 2 set forth hereinbefore, the object being in so far as possible to regenerate an amount of nitrogen dioxide substantially equivalent to the amount thereof consumed in the first reaction zone. Suitable temperatures for the reaction of nitric oxide with nitric acid in the second reaction zone have been found to be between about 75° C. and about 125° C. with temperatures between about 90° C. and about 110° C. being preferred. A relatively wide range of pressures, between about atmospheric pressure and about 10 atmospheres, can be utilized in carrying out the reaction in the second reaction zone. Atmospheric pressure is preferred, however.

Suitable concentrations for nitric acid employed in the second reaction zone are between about 55% and about 68% by weight HNO₃, the azeotropic mixture being preferred.

Reference to Reaction 2 set forth hereinabove shows that stoichiometrically 2 mols of HNO₃ are required for each mol of nitric oxide introduced into the second reaction zone, and for the purposes of this invention this represents the minimum amount of HNO₃. Generally, an excess of HNO₃ over theoretical stoichiometric requirements, up to about 6 mols of HNO₃ per mol of nitric oxide, will be employed. Accordingly, therefore, the amount of weak aqueous nitric acid fed to the second reaction zone must be at least sufficient in HNO₃ content to be stoichiometrically equivalent to the amount of nitric oxide introduced into the second reaction zone. Preferably, the amount of weak aqueous nitric acid fed to the second reaction zone will contain sufficient HNO₃ to provide between about 2 mols and about 6 mols of HNO₃ for each mol of nitric oxide introduced into the second reaction zone.

When using packed columns for first reaction zone 13 and second reaction zone 27, optimum performance is obtained by film flow of nitric acid over the packing rather than by flooding the packing with nitric acid. However, plate designs may be utilized in lieu of packing.

Since the reactants and product streams of this invention are corrosive in nature, the materials of construction for all parts of the system should be corrosion resistant, as for example, stainless steel, or equivalent material.

The following example sets forth a specific embodiment of the invention. It is to be understood, however, that the invention is in no way limited to this example, since this invention may be practiced by the use of various modifications within the scope of the invention as hereinabove described. In the following example all parts and percentages are by weight, unless otherwise designated.

*Example*

In this example both the first reaction zone and the second reaction zone were enclosed, stainless steel cylindrical columns, jacketed for heat exchange, and packed through approximately 80% of their height with acid-resistant Berl saddles, the ratio of height to diameter being approximately 20:1 for each reaction zone. A weak aqueous nitric acid consisting essentially of the azeotropic mixture of 68% by weight of HNO₃ and 32% water was introduced into the upper portion of the first reaction zone at the rate of approximately 10 parts per minute so that the acid flowed downwardly in the first reaction zone by film flow over the packing, rather than by flooding the packing. Approximately 12.6 parts per minute of nitrogen dioxide were passed into the lower portion of the first reaction zone in countercurrent flow to the nitric acid flowing downwardly through the first reaction zone. The temperature in the first reaction zone was maintained at about 30° C. by water circulating through the jacket, and pressure was maintained at atmospheric pressure. Approximately 19 parts per minute of highly concentrated nitric acid containing approximately 91% by weight of HNO₃ were recovered from the bottom of the first reaction zone, and this highly concentrated nitric acid was then subjected to rectification by fractional distillation to yield 99+% nitric acid as an overhead product and 68% nitric acid as a still residue, which 68% nitric acid was recycled into the upper portion of the first reaction zone.

Approximately 2.5 parts per minute of nitric oxide were taken off as an overhead product from the first reaction zone and were passed into the lower portion of the second reaction zone maintained at about 100° C. by low pressure steam circulating through the jacket thereof, and at atmospheric pressure. Approximately 38.6 parts per minute of a weak aqueous nitric acid consisting essentially of the azeotropic mixture of 68% by weight of $HNO_3$ and 32% water were introduced into the upper portion of the second reaction zone so that the acid flowed downwardly in the second reaction zone by film flow over the packing, rather than by flooding the packing, countercurrent to the flow of nitric oxide upwardly through the second reaction zone.

Approximately 10.3 parts per minute of nitrogen dioxide were recovered as an overhead product from the second reaction zone, and this recovered nitrogen dioxide was recycled to the lower portion of the first reaction zone, augmented by approximately 2.3 parts per minute of fresh make-up nitrogen dioxide introduced into the process to keep the same in balance.

Approximately 30.4 parts per minute of diluted nitric acid containing about 55.3% by weight $HNO_3$ and about 44.7% $H_2O$ were withdrawn from the bottom of the second reaction zone and were subjected to fractional distillation to regenerate approximately 24.7 parts per minute of the azeotropic mixture containing 68% by weight of $HNO_3$, which was recycled to the upper portion of the second reaction zone, augmented by approximately 13.9 parts per minute of fresh make-up azeotropic mixture containing 68% by weight of $HNO_3$ introduced into the process to replace $HNO_3$ consumed in the second reaction zone.

From the foregoing, it will be apparent to those skilled in the art that the process shown and described herein can be practiced with advantage in conjunction with an ammonia oxidation plant, from which both the weak aqueous nitric acid and the nitrogen dioxide employed in the process of this invention are obtainable. However, it will be appreciated that the invention is not to be construed as so limited and actually may be carried out by the use of various modifications and changes without departing from its spirit and scope with only such limitations placed thereon as are imposed by the appended claims.

What I claim and desire to protect by Letters Patent is:

1. A cyclic process for producing highly concentrated nitric acid which comprises passing a nitrogen oxide reactant consisting essentially of nitrogen dioxide into the lower portion of a first reaction zone maintained at a temperature below about 40° C. in countercurrent flow to aqueous nitric acid containing not more than 68% by weight of $HNO_3$, the amount of said nitrogen dioxide being at least sufficient to form with said aqueous nitric acid a highly concentrated nitric acid containing more than 68% by weight of $HNO_3$, recovering the thus formed highly concentrated nitric acid as a bottoms product from the lower portion of the first reaction zone, taking off nitric oxide as an overhead product from the first reaction zone and passing the same into the lower portion of a second reaction zone maintained at a temperature between about 75° C. and about 125° C. in countercurrent flow to a second aqueous nitric acid containing between about 55% and not more than 68% by weight of $HNO_3$, said second aqueous nitric acid being at least stoichiometrically equivalent in $HNO_3$ content to said nitric oxide, recovering nitrogen dioxide as an overhead product from the upper portion of the second reaction zone and recycling the recovered nitrogen dioxide into the lower portion of the first reaction zone.

2. A cyclic process for producing highly concentrated nitric acid which comprises passing a nitrogen oxide reactant consisting essentially of nitrogen dioxide into the lower portion of a first reaction zone maintained at a temperature below about 40° C. in countercurrent flow to aqueous nitric acid containing not more than 68% by weight of $HNO_3$, the amount of said nitrogen dioxide being between about 0.05 and about 10 parts by weight per part by weight of said aqueous nitric acid and at least sufficient to form with said aqueous nitric acid a highly concentrated nitric acid containing more than 68% by weight of $HNO_3$, recovering the thus formed highly concentrated nitric acid as a bottoms product from the lower portion of the first reaction zone, taking off nitric oxide as an overhead product from the first reaction zone and passing the same into the lower portion of a second reaction zone maintained at a temperature between about 75° C. and about 125° C. in countercurrent flow to a second aqueous nitric acid containing between about 55% and not more than 68% by weight of $HNO_3$, the amount of said second aqueous nitric acid being sufficient to provide between at least 2 mols and about 6 mols of $HNO_3$ for each mol of nitric oxide passed into the second reaction zone, recovering nitrogen dioxide as an overhead product from the upper portion of the second reaction zone and recycling the recovered nitrogen dioxide into the lower portion of the first reaction zone.

3. A continuous cyclic process for producing highly concentrated nitric acid which comprises continuously introducing aqueous nitric acid containing not more than 68% by weight of $HNO_3$ into the upper portion of a first reaction zone maintained at a temperature below about 40° C., continuously passing a nitrogen oxide reactant consisting essentially of nitrogen dioxide into the lower portion of the first reaction zone in countercurrent flow to said aqueous nitric acid, the amount of said nitrogen dioxide being at least sufficient to form with said aqueous nitric acid a highly concentrated nitric acid containing more than 68% by weight of $HNO_3$, continuously recovering the thus formed highly concentrated nitric acid as a bottoms product from the lower portion of the first reaction zone, continuously taking off nitric oxide as an overhead product from the first reaction zone and passing the same into the lower portion of a second reaction zone maintained at a temperature between about 75° C. and about 125° C., continuously introducing a second aqueous nitric acid containing between about 55% and not more than 68% by weight of $HNO_3$ into the upper portion of the second reaction zone in an amount at least stoichiometrically equivalent in $HNO_3$ content to said nitric oxide and in countercurrent flow to said nitric oxide, continuously taking off an aqueous nitric acid more dilute than said second aqueous nitric acid as a bottoms product from the lower portion of the second reaction zone, continuously recovering nitrogen dioxide as an overhead product from the upper portion of the second reaction zone and continuously recycling the recovered nitrogen dioxide into the lower portion of the first reaction zone.

4. The process in accordance with claim 3 in which the aqueous nitric acid taken off as a bottoms product from the lower portion of the second reaction zone is subjected to fractional distillation to remove water therefrom and regenerate aqueous nitric acid containing between about 55% and not more than 68% by weight of $HNO_3$, and recycling the resulting regenerated acid into the upper portion of the second reaction zone.

5. The process in accordance with claim 3 in which the highly concentrated nitric acid recovered as a bottoms product from the lower portion of the first reaction zone is subjected to fractional distillation to produce highly concentrated nitric acid of 99+% $HNO_3$ and the azeotropic mixture containing 68% by weight $HNO_3$ and 32% water, and recycling the azeotropic mixture into the upper portion of the first reaction zone.

6. A continuous cyclic process for producing highly concentrated nitric acid which comprises continuously introducing aqueous nitric acid containing not more than 68% by weight of $HNO_3$ into the upper portion of a first reaction zone maintained at a temperature below about 40° C., continuously passing a nitrogen oxide reactant consisting essentially of nitrogen dioxide into the lower portion of the first reaction zone in countercurrent flow to said aqueous nitric acid, the amount of said nitrogen dioxide being at least sufficient to form with said aqueous nitric acid a highly concentrated nitric acid containing more than 68% by weight of $HNO_3$, continuously recovering the thus formed highly concentrated nitric acid as a bottoms product from the lower portion of the first reaction zone, continuously taking off nitric oxide as an overhead product from the first reaction zone and passing the same into the lower portion of a second reaction zone maintained at a temperature between about 75° C. and about 125° C., continuously introducing a second aqueous nitric acid containing between about 55% and not more than 68% by weight of $HNO_3$ into the upper portion of the second reaction zone in an amount at least stoichiometrically equivalent in $HNO_3$ content to said nitric oxide and in countercurrent flow to said nitric oxide, continuously taking off an aqueous nitric acid more dilute than said second aqueous nitric acid as a bottoms product from the lower portion of the second reaction zone, continuously recovering nitrogen dioxide as an overhead product from the upper portion of the second reaction zone, continuously recycling the recovered nitrogen dioxide into the lower portion of the first reaction zone, and supplying fresh make-up nitrogen dioxide and aqueous nitric acid containing not more than 68% by weight of $HNO_3$ as needed to keep the process in balance.

References Cited in the file of this patent

UNITED STATES PATENTS

| | | |
|---|---|---|
| 2,088,057 | Handforth | July 27, 1937 |
| 2,098,953 | Christensen | Nov. 16, 1937 |
| 2,123,467 | Hobler | July 12, 1938 |
| 2,132,663 | Voogd | Oct. 11, 1938 |
| 2,185,580 | Beekhuis | Jan. 2, 1940 |